United States Patent [19]

Lass

[11] 4,288,655

[45] Sep. 8, 1981

[54] CABLE LOCK ASSEMBLY FOR OUTLET BOX

[75] Inventor: John L. Lass, Homewood, Ill.

[73] Assignee: Square D Company, Palatine, Ill.

[21] Appl. No.: 81,944

[22] Filed: Oct. 4, 1979

[51] Int. Cl.³ ............................................. H02G 3/08
[52] U.S. Cl. ................................ 174/65 R; 24/134 R; 339/103 R
[58] Field of Search .............................. 174/65 R, 53; 339/103 R, 103 M; 220/3.2, 3.3, 3.4, 3.5, 3.6; 285/128, 129; 24/132 R, 132 WL, 134 R

[56] References Cited

U.S. PATENT DOCUMENTS

| | | | |
|---|---|---|---|
| 1,129,973 | 3/1915 | Gauthier | 285/128 |
| 3,354,518 | 11/1967 | Hoover | 24/134 R |
| 3,845,457 | 10/1974 | Reimer | 339/103 R |
| 4,190,222 | 2/1980 | Appleton et al. | 248/56 |

FOREIGN PATENT DOCUMENTS

| | | | |
|---|---|---|---|
| 1016644 | 8/1977 | Canada | 174/65 R |
| 498411 | 1/1939 | United Kingdom | 285/128 |

*Primary Examiner*—Gene Z. Rubinson
*Assistant Examiner*—D. A. Tone
*Attorney, Agent, or Firm*—John R. Garrett; Carmen B. Patti; Richard T. Guttman

[57] ABSTRACT

A cable lock assembly includes first and second members pivotally interconnected and defining a cable receiving slot. The members have interlocking means defining a closed position to securely grip the cable between the members. In one version, the second member has a locking cleat pivoted thereon and the locking cleat has sharp edges that bite into the cable. In another version, the interlocking means includes a pair of projections on one member and two spaced pairs of recesses on the other member that define two locked positions for the members.

19 Claims, 12 Drawing Figures

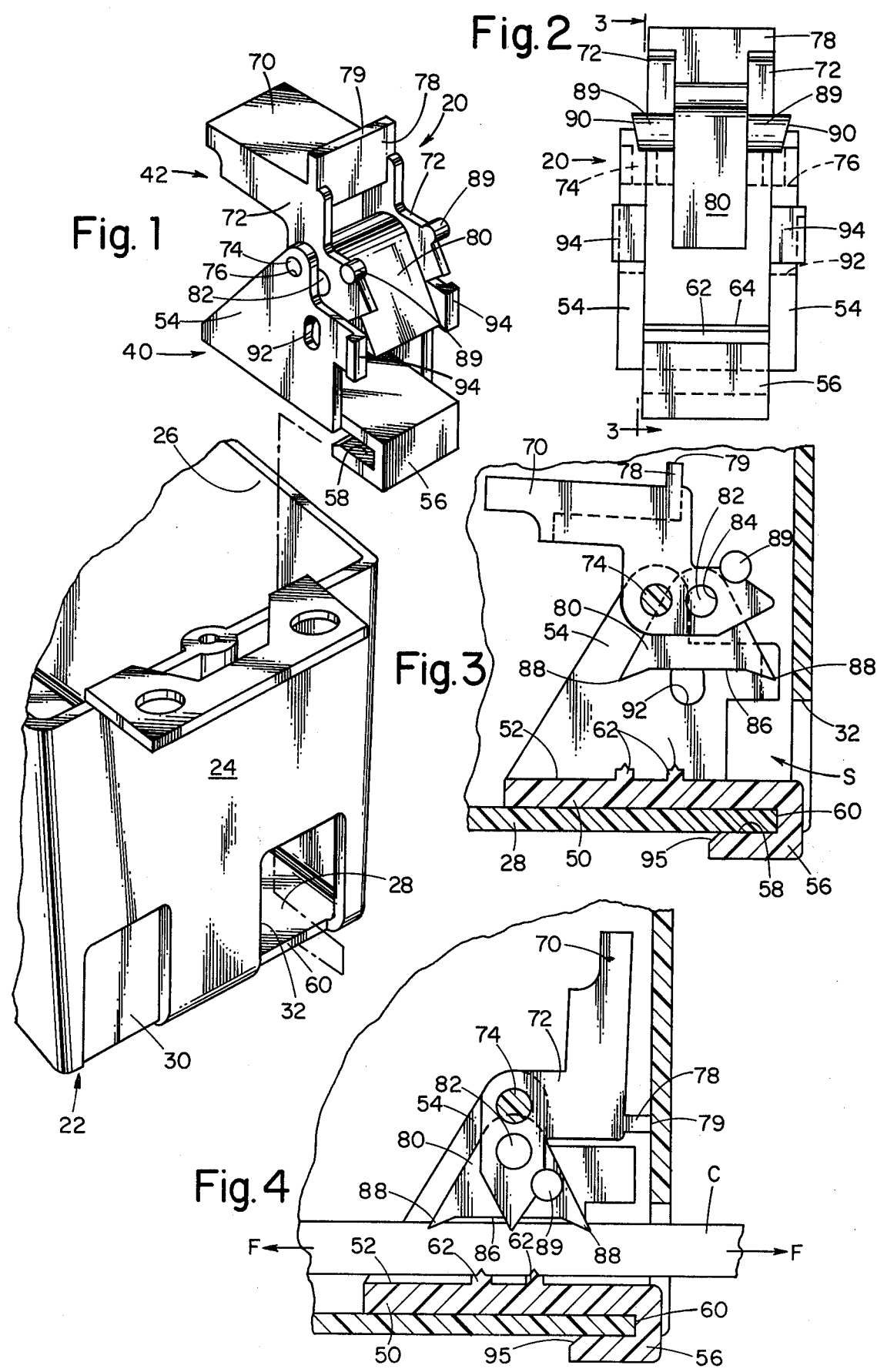

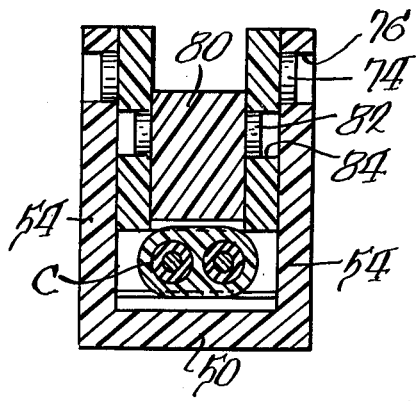
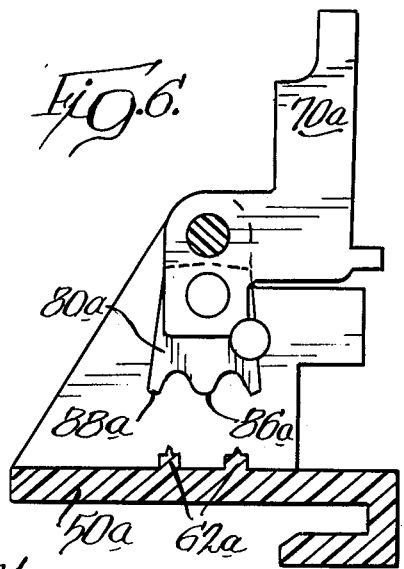
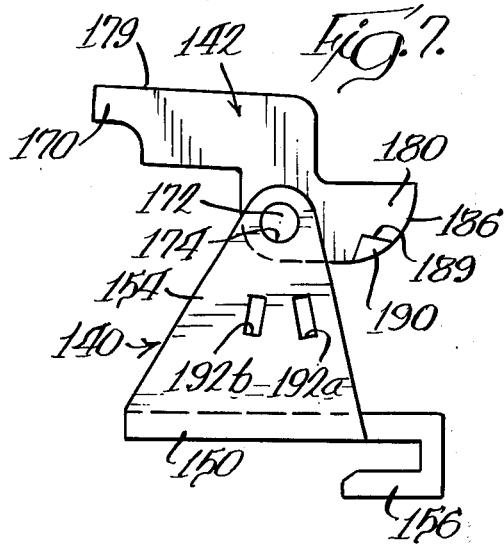
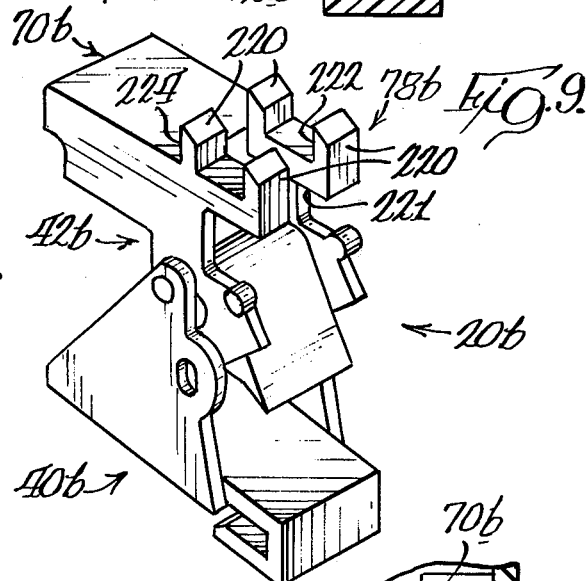
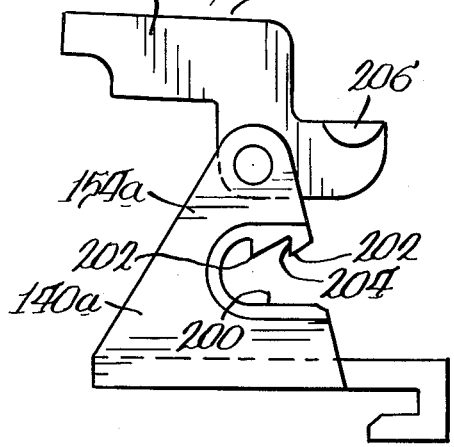
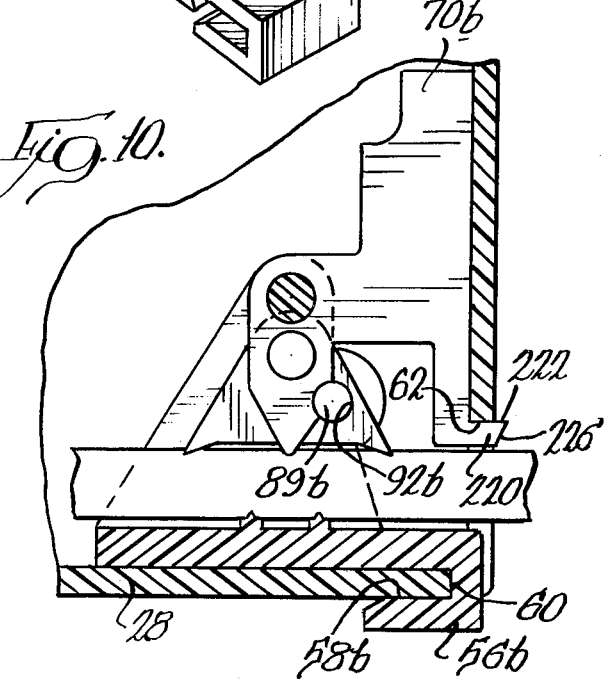

CABLE LOCK ASSEMBLY FOR OUTLET BOX

DESCRIPTION

TECHNICAL FIELD

The present invention relates generally to electrical outlet boxes adapted to have electrical devices supported therein and attached to a cable extending through a hole in a wall of the outlet box and more specifically to a cable lock assembly for locking the cable within the box.

Heretofore, cable connectors for supporting cables in components such as outlet boxes consisted primarily of a metal collar which had a peripheral thread and utilized a nut received on the thread to connect the collar into an outlet box. Subsequently a second clamping means usually grasped the cable and cooperated with the threaded collar to retain the cable within the outlet box. Not only is such an arrangement costly in terms of manufacturing several parts, there is a tremendous labor cost of inserting the various parts in appropriate sequence within the electrical box.

BACKGROUND ART

Numerous substitutes have been proposed for the conventional metallic collar and threaded nut arrangement and examples of such devices are disclosed in U.S. Pat. Nos. 3,751,579; 3,493,205 and 3,424,856. All of these devices are designed to be fitted into a specially designed opening in a support member which, of course, requires specially designed components manufactured by other competitors.

SUMMARY OF THE INVENTION

According to the present invention, the cable lock assembly is designed so that it can be utilized with any conventional metal or non-metallic outlet box having a conventional knock-out hole of a general configuration and which can be installed by the manufacturer or supplied separately for installation on the job site.

The cable lock assembly consists of first and second members that are pivotally interconnected and the first member has a cable engaging surface which is adapted to be generally aligned with the knock-out hole and the second member has a second cooperating cable engaging surface pivotable towards the first surface to grip a cable therebetween. The two members have locking means for interlocking with each other to define the locked position while the first member has a locking element for securing the entire assembly to an edge of an outlet box for retaining the cable within the knock-out hole.

In one specific embodiment, the first member has a generally flat base with a pair of legs extending upwardly from opposite edges thereof and an integral lip on one end thereof which defines a recess for receiving an edge of the outlet box. The second member is pivotally supported between the legs of the first member and has a locking cleat pivotally supported thereon with the second member and locking cleat movable between a first open position and a second closed position with the closed position being defined by the cooperating lock means defined on the legs of the first member and the second member. In this embodiment, the base of the first member has a pair of ribs extending from a cable engaging surface with the locking cleat having a pair of spaced sharp edges defined on opposite ends of the cable engaging surface so that the assembly is capable of resisting pulling forces applied to the cable on either side of the lock assembly.

In a second version of the invention, the second member has an arcuate cable engaging surface adjacent one end thereof and a gripping portion adjacent the other end thereof.

In a further version of the invention, the second or pivotable member also has further lock means cooperating with the edge of the knock-out hole to secure the entire assembly to the outlet box.

In all versions of the invention, the lock assembly substantially blocks the knock-out hole when the members are in a locked condition.

BRIEF DESCRIPTION OF THE SEVERAL VIEWS OF THE DRAWINGS

FIG. 1 discloses a perspective view of the lock assembly of the present invention in its disassembled condition in association with an outlet box;

FIG. 2 is an end view of the lock assembly shown in FIG. 1;

FIG. 3 is a side view as viewed along line 3—3 of FIG. 2 showing the cable lock assembly in an open condition and positioned in the outlet box for receiving a cable;

FIG. 4 is a view similar to FIG. 3 showing the cable lock assembly in a locked or closed condition;

FIG. 5 is a transverse sectional view of the cable lock assembly;

FIG. 6 is a view of the lock assembly generally similar to

FIG. 3 showing a slightly modified form of the invention;

FIG. 7 is a side elevation view of a further modified form of the lock assembly in an open condition for receiving a cable;

FIG. 8 is a view similar to FIG. 7 showing a further modified form of lock assembly;

FIG. 9 is a view similar to FIG. 1 showing a further modified lock assembly in an open condition; and FIG. 10 shows the lock assembly of FIG. 9 in position in an outlet box.

DETAILED DESCRIPTION

Figures 11, 12:
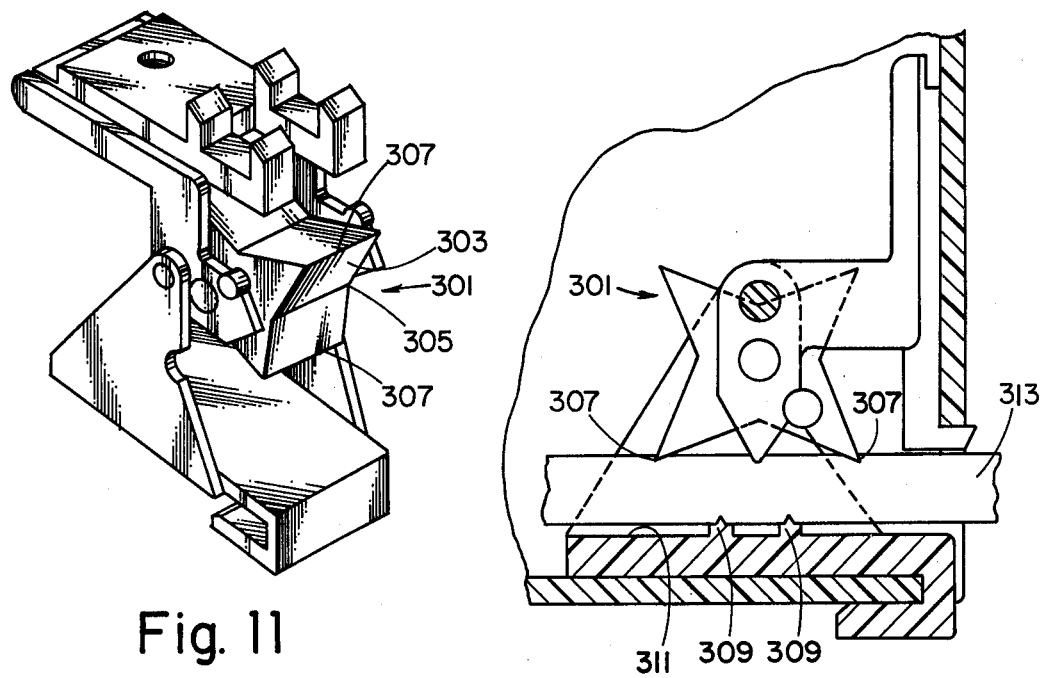
FIG. 11 is a perspective view of an alternative embodiment of the cable lock assembly.
FIG. 12 is a side view of the FIG. 11 alternative embodiment.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings discloses a cable lock assembly, generally designated by reference numeral 20, adapted to be installed into an outlet box 22 having end walls 24 and sidewalls 26 with a bottom wall 28 cooperating therewith to define an open-topped receptacle or outlet box adapted to receive an electrical component, such as an electrical switch. Wall 24 has a plurality of knock-out elements 30 adapted to be removed to define a knock-out hole 32 (only one of each being shown in FIG. 1).

According to the present invention, a cable lock assembly 20 is designed to securely lock a cable therein, such as an insulated cable, and is capable of meeting all existing code performance standards. Cable lock assembly 20 consists of a first member 40 having a second member 42 pivotally supported thereon and movable between first and second positions. As most clearly illustrated in FIGS. 1 and 3, the first member includes a base portion 50 that has the base or cable engaging surface 52 defined thereon and a pair of legs 54 extending from opposite edges thereof. Base portion 50 also has a locking element 56 integral with one end thereof and the locking element is in the form of a locking lip that defines an elongated recess 58 adjacent the lower surface of base portion 50. Recess 58 is adapted to receive a free edge portion 60 of bottom wall 28, as will be described in more detail later. Cable engaging surface 52 also has a pair of spaced ribs or projections 62 extending from the surface thereof with projections 62 having locking barbs 64 for a purpose that will also be described later.

The second member 42 consists of a manually grippable element 70 that has a pair of integral legs 72 depending therefrom and each leg has an integral pin 74 adapted to be received into an opening 76 defined at the upper end of each leg 54 so that second member 42 can be pivoted on first member 40 between the legs 54. The manually grippable portion 70 also has an extension 78 which has a wall engaging surface 79 on the free end thereof.

Second member 42 also has a locking element or cleat 80 pivotally supported thereon and cleat 80 is substantially triangular in side elevation view as seen in FIG. 3. Triangular locking cleat 80 has a pair of integral projections 82 adjacent the upper apex and extending from opposed surfaces thereof. Projections 82 are received into openings 84 defined on legs 72 of manually grippable portion or member 70 so as to be pivotally supported thereon. Locking cleat 80 also has a base 86 which defines a cable engaging surface and base 86 has integral projections or extensions 88 adjacent opposite ends thereof that terminate in substantially sharp points, as illustrated in FIG. 3. The extensions 88 define elongated cable engaging edges, for a purpose that will be described later.

Cable lock assembly 20 also has interlocking means between first and second members 40 and 42 which define a closed locked position for the members with respect to each other. In the illustrated embodiment, this cooperating lock means consists of a pair of projections 89 integral with the respective legs 72 of manually grippable member 70 with the outer free ends of the projections having inclined surfaces 90, as illustrated in FIG. 2. Each of the legs 54 of first member 40 has a recess or opening 92 adapted to receive projections or locking elements 89 therein in a manner to be described later. The first legs 54 on first member 40 also have a pair of abutments 94 respectively defined thereon that are adapted to engage a wall of outlet box 22.

Before describing the operating of the unique lock assembly, the manner of installing the assembly into outlet box 22 will first be described. The entire assembly 20 is inserted outwardly through knock-out hole 32 until abutments 94 engage end wall 24 so that the free edge of locking lip 56 is located outside the free edge or exposed edge 60 of bottom wall 28.

The entire assembly is then forced downwardly so that the lower surface of base portion 50 is in engagement with the inner surface of bottom wall 28 and the assembly is moved to force the free edge 60 into recess 58. For this purpose, it may be desirable to have a camming surface 95 on the free edge of lip 56 to guide edge 60 into recess 58.

With the cable lock assembly in the position illustrated in FIG. 3, wherein second member 42 is in an open position, which may be defined by engaging abutments (not shown) on legs 54 and 72, members 40 and 42 cooperate with each other to define a cable receiving space or slot S that is generally aligned with the knock-out hole 32. A cable C can then be axially inserted from the outside of hole 32 through space S so that the inner free end (not shown) is the desired distance from the locking assembly for attachment of the wires therein to a suitable electrical component, such as a switch. Manually grippable portion 70 is then grasped by the installer and pivoted from the position illustrated in FIG. 3 to the position illustrated in FIG. 4. During the movement from the open or first position illustrated in FIG. 3 to the closed or second position illustrated in FIG. 4, the inclined surfaces 90 will initially engage the inner surfaces until aligned with recesses or openings 92. When projections 89 are aligned with openings 92, the inherent resiliency of the plastic legs will tend to cause the legs to move towards each other and lock the projections within the recesses to define the closed lock position for cable lock assembly 20. In the locked position, the extensions or sharp edges 88 of triangular cleat 80 bite into the insulation of cable C while the barbs 64 on ribs or projections 62 will bite into an opposed surface of the cable. Thus, the cable is securely locked within the space S by the cooperating members.

With the assembly in the locked condition illustrated in FIG. 4, surface 79 of integral extension 78 is in engagement with the inner surface of wall 24 to securely lock the assembly within the outlet box. In this position, the cable lock assembly is capable of resisting forces F applied in either axial direction as indicated by the arrows in FIG. 4. Assuming that a force F is applied to the left-hand end of cable C, such force will tend to pivot locking cleat 80 clockwise about its pivot pins 82 and increase the gripping force of edge or foot 88 on the right-hand edge of cleat 80 to increase the locking reaction between ribs 62 and projection 88. Of course, the greater the force F, the greater locking reaction will result. If the force is applied adjacent the opposite edge of triangular cleat 80, the force will tend to pivot locking cleat 80 counter clockwise about its pivot pins 82 and increase the gripping force of edge or foot 88 on the left-hand side of cleat 80 to increase the locking reaction between ribs 62 and projection 88. The cable lock assembly is, therefore, capable of equally arresting movement of the cable into or out of the outlet box 22 and also resists tangential and radial loads on the cable.

It will be appreciated from the above description that the advantages of the lock assembly 20 illustrated in FIGS. 1 through 5 are numerous. For example, the three separate components 40, 70 and 80 may be injection molded utilizing a single step molding process with a Nylon material and the respective components can then readily be assembled as illustrated in FIG. 1 to produce a cable lock assembly that is completely and physically independent of the outlet box. The assembly does not require any special tools for installation and operation and is reusable an infinite number of times. Furthermore, in the event that there is a structural failure of any of the components, the entire assembly can be removed and replaced without discarding the remainder of the outlet box 22. It has been determined that the three component assembly as illustrated, the same device is capable of firmly gripping non-metallic insulated cable of the two or three wire variety with or without a ground wire.

If desired, and if it were necessary to accommodate a wide variety of wire thicknesses, the interlocking elements 89 and 92 could be redesigned or interchanged dimensionally to define a plurality of locked positions for different sizes of wires. Also, the entire assembly could be constructed of metal or a variety of different types of synthetic materials.

A slightly modified form of the invention is illustrated in FIG. 6 and in many respects is similar to the embodiment illustrated in FIGS. 1 through 5 so that only the differences will be described in detail and the same reference numerals will be repeated with the suffix "a" appended thereto.

In the modified form illustrated in FIG. 6, locking cleat 80a has a generally sinusoidal or serrated surface 86a which is adapted to engage cable C and the sinusoidal surface defines projections 88a with adjacent pairs of projections cooperating to define recesses therebetween. The recesses are positioned so as to be generally in alignment with projections 62a extending from base 50a when the assembly is in the closed locked condition (not shown).

The remaining components of the lock assembly illustrated in FIG. 6 are substantially identical to those described in connection with the embodiment of FIGS. 1 through 5 so that a detailed description thereof does not appear to be necessary. The operation of the modified assembly of FIG. 6 is substantially identical to that described above. It is believed that such a modified version would have special applicability for cables that are extremely flexible and pliable with restorative elasticity since the spaced recesses cooperating with the spaced projections 62 could more firmly grip the cable therebetween.

A further modified form of the invention is illustrated in FIG. 7 and again includes a first member 140 having a base 150 with a locking lip 156 at one end thereof and a pair of legs 154 extending from opposite edges thereof (only one being shown). A second member 142 is pivotally supported on the upper free ends of legs 154 through integral projections 172 adapted to be received into openings 174. Second member 142 has a gripping portion 170 at one end thereof and a cable engaging portion 180 at the opposite end thereof and cable engaging portion 180 has an arcuate cable engaging surface 186.

Members 140 and 142 again have interlocking means defining locked positions for the respective members. In this embodiment, the interlocking means consists of a pair of projections 189 that have inclined camming surfaces 190 on the outer surface thereof with a first and a second pair of recesses 192a and 192b respectively defined on the respective legs 54 of first member 140. In this embodiment of the invention, the first pair of respective recesses 192a define a first locked position for the members with respect to each other while the second pair of respective recesses define a second locked position for the members which locked positions may be designed to have a varying space between arcuate surface 186 and the surface on base member 50. Again, first member 142 has a surface 179 for engaging an inner surface of wall 24 which has the knock-out hole 32 therein so that the cable lock assembly is securely locked within the outlet box when the members 140 and 142 are in a locked position.

A slightly further modified form of the invention is illustrated in FIG. 8 and differs from the embodiment illustrated in FIG. 7 in the particular interlocking means between members 140a and 142a. In the embodiment illustrated in FIG. 8, each leg 154a has an elongated slot 200 extending from one edge thereof and the upper edge of the slot has a pair of spaced projections 202 defining two recesses 204. The respective recesses 204 are adapted to receive projections 206 located on opposite sides of second member 142 and the respective recesses define the respective locked positions for the member 140a and 142a. In all other respects, the modified assembly illustrated in FIG. 8 is substantially identical to that illustrated in FIG. 7.

A further modified form cable lock assembly is illustrated in FIGS. 9 and 10 and is in many respects identical to that illustrated in FIGS. 1–5. Therefore, common reference numerals will be used for common parts with the addition of the suffix "b" appended thereto. The cable lock assembly 20b again includes a first member 40b which is identical to first member 40 and a pivoted second member 42b which is substantially identical to member 42.

In this version of the invention, extension 78 is replaced with projection means 78b. Projection means 78b consists of four projections 220 which are supported on two spaced legs 221 and are arranged so that the upper surfaces 222 of one transversely spaced pair of projections or lugs are horizontally aligned while the upper surfaces 224 of the second pair of lugs are also aligned and are spaced from the first surfaces 222. Surfaces 222 and 224 therefore defines two vertically spaced ledges when the member 70 is in the vertical locked position illustrated in FIG. 10. The outer ends of lugs 200 have tapered surfaces 226.

Surfaces 222 or 224 are adapted to engage an edge 62 of the knock-out hole which is opposite bottom edge 60 and is in sidewall 24. The respective spaced pairs of lugs 220 are adapted to accommodate holes of different sizes. If surfaces 222 are to be used, the installer removes the upper pair of lugs before the cable lock assembly is installed into outlet box 22.

During installation, cable lock assembly 20b is initially installed with the second member in the position illustrated in FIG. 9 and locking lip 56b is moved under bottom wall 28 and exposed edge 60 is forced into recess 58b. Cable C is then inserted into the cable slot and is locked in position by pivoting the second member to its locked position illustrated in FIG. 10. During such pivotal movement, the inclined surfaces 226 initially engage the inner surface of wall 24 and legs 221 that support projections 220 will deflect inwardly until surfaces 222 are aligned with edge 62. At that time, the legs will move forward so that surfaces 222 will engage edge 62 and positively lock the assembly in the outlet box. In the locked position illustrated in FIG. 10, locking elements 89b are located in recesses 92b so that the entire assembly will be positively retained in the position illustrated.

Of course, if the knock-out hole is larger than illustrated in FIG. 10, the upper lugs 220 are retained on legs 221 and surfaces 224 are used to lock the assembly in the outlet box.

Another modified form of cable lock assembly is illustrated in FIGS. 11 and 12 and is similar to the form shown in FIGS. 9 and 10 with the exception of the locking cleat and lock means.

In this version of the invention, the locking cleat 301 is generally square. The generally square locking cleat 301 is pivoted about a central portion thereof. A cable engaging surface is defined by each of the four sides 303 with each side having an indentation 305 defining edges 307. The edges 307 cooperate with the projection 309 on the cable engaging surface 311 to grip the cable 313 as shown in FIG. 12. In this form any one of the four sides 303 may be used to lock the cable 313 in position.

In all versions of the invention, the assembly, particularly the components thereof are designed to be produced economically as a separate structure physically independent of the outlet box and which can be opened and closed repeatedly without destruction thereof. Furthermore, in the event that there is a failure of any component of the lock assembly, the entire lock assembly can readily be removed and replaced with a new lock assembly without any modification of the basic outlet box for which the assembly is specifically designed.

It should also be noted that while the particular cable lock assembly has been specifically described in connection with use for maintaining a cable within an outlet box, the concept of the pivotally interconnected members could readily be utilized in other environments, such as where a cable must be passed through a wall structure and maintained therein.

What is claimed is:

1. In an electrical outlet box having at least one knock-out hole in one wall, a cable lock assembly including a first member having a locking lip defining a recess receiving a free edge of said knock-out hole to secure said assembly to said outlet box, said first member having a first cable engaging surface generally aligned with said hole and having a pair of legs extending away from said surface, a second member pivotally supported on said legs of said first member, said second member having a portion engaging said one wall adjacent said knock-out hole in said closed position to substantially enclose said hole and lock said assembly in said outlet box, said second member having a second cable engaging surface pivotal toward said first cable engaging surface to grip a cable therebetween.

2. An outlet box as defined in claim 1, in which said second member includes a manually grippable portion pivoted between first and second positions on said legs and a locking cleat pivotal on said grippable portion and having said second cable engaging surface defined thereon.

3. An outlet box as defined in claim 2, in which said locking cleat is generally triangular with said second cable engaging surface defined by a base of said triangle with said base having extensions defining edges and said first cable engaging surface has projections with said projections and edges cooperating to grip said cable.

4. An outlet box as defined in claim 2, in which said locking cleat is generally square with said second cable engaging surface defined by each of the four sides of said cleat with each of said sides having an indentation defining edges and said cable engaging surface has projections with said projections and edges cooperating to grip said cable.

5. An outlet box as defined in claim 2, in which said manually grippable portion has a pair of legs pivotally supported on said legs of said first member and said locking cleat is pivotally supported between said legs of said manually grippable portion.

6. An outlet box as defined in claim 5, in which each leg of said manually grippable portion has a projection extending therefrom and each leg of said first member has a recess for receiving a projection and in which said first member has a locking lip defining a recess for receiving an edge of a bottom wall of said outlet box and said manually grippable portion has an extension engaging said one wall to lock said assembly in said outlet box when said projections are in said recesses.

7. An outlet box as defined in claim 2, in which said second member has projection means engaging an opposite edge of said knock-out hole opposite said free edge to secure said assembly to said outlet box.

8. A cable lock assembly for use with an outlet box having a cable received therein, comprising a first member having a base portion with a base surface, and a pair of legs extending from opposite sides thereof, a second member pivotally supported between said legs of said first member, said second member having a cable engaging surface cooperating with said base surface to freely and slidably receive a cable therebetween, said second member having an element pivotally supported thereon with said cable engaging surface defined thereon, said second member being pivoted to a second position to lock said cable between said members.

9. A cable lock assembly as defined in claim 8, in which said second member includes a manually grippable element having a pair of legs depending therefrom with the legs of said members having a pivotal connection to accommodate pivotal movement of said surfaces toward each other.

10. A cable lock assembly as defined in claim 8, in which said second member has projections on opposite sides of said cable engaging surface and said legs have a first pair of respective recesses receiving said projections defining a first locked position for said members and a second pair of respective recesses defining a second locked position for said members.

11. A cable lock assembly as defined in claim 8, in which said second member has a generally triangular locking cleat pivoted about an apex thereof with said cable engaging surface defined on a base of said locking cleat spaced from said apex, said base of said locking cleat having projections at opposed ends thereof defining edges extending transversely between said legs and said base surface having at least one projection located intermediate said edges when said second member is in said second position.

12. A cable lock assembly as in claim 8, in which said second member has a generally square locking cleat pivoted about a central portion thereof with said cable engaging surface defined as any one of said four sides of said cleat, each of said sides of said cleat having an indentation defining edges extending transversely between said legs and said base surface having at least one projection located intermediate said edges when said second member is in said second position.

13. A cable lock assembly as defined in claim 8, in which said first member has a locking lip defining a recess adapted to receive an exposed edge of a bottom wall of said outlet box and said second member has spaced projections adapted to engage an opposite edge of said knock-out hole to lock said assembly to said outlet box.

14. In an electrical outlet box having sidewalls and a bottom wall with a knock-out hole at one juncture between said bottom wall and one sidewall and an exposed edge of said bottom wall located adjacent said hole, a cable lock assembly including a first member having a base supported on said bottom wall with said base having an integral lip defining a recess receiving said exposed edge and a pair of legs extending from opposed edges of said base to define a cable receiving space aligned with said hole, a second member pivotally supported between said legs and having a cable engaging surface, said second member having an open position and a closed position with said cable engaging surface cooperating with said base to grip a cable in said closed position, said second member having a portion engaging said one sidewall in said closed position to lock said assembly in said box, and interlocking means between said second member and said legs of said first member defining said closed position.

15. An electrical outlet box as defined in claim 14, in which said second member includes a manually grippable portion pivoted between said legs and a locking cleat pivoted on said manually grippable portion with said cleat having spaced cable engaging edges and in which said base has at least one rib extending therefrom and located between said edges when said members are in said second position.

16. An electrical outlet box as defined in claim 15, in which said cleat has spaced recesses extending generally parallel to said edges.

17. An electrical outlet box as defined in claim 14, in which said interlocking means includes a pair of projections extending from said second member with said legs each having a pair of spaced recesses adapted to receive said projections and defining first and second closed positions.

18. An electrical outlet box as defined in claim 17, in which each leg has a slot extending from an edge thereof with said slot having a pair of projections defining said pair of spaced recesses.

19. An electrical outlet box as defined in claim 14, in which said portion includes at least one projection engaging an edge of said knock-out hole on said one sidewall which is opposite said exposed edge to lock said assembly in said outlet box.

* * * * *